United States Patent
Yao et al.

(10) Patent No.: US 7,159,300 B2
(45) Date of Patent: Jan. 9, 2007

(54) METHOD FOR MANUFACTURING A SUSPENSION DESIGN FOR A CO-LOCATED PZT MICRO-ACTUATOR

(75) Inventors: Ming Gao Yao, Dongguan (CN); Masashi Shiraishi, Kowloon (HK); Yi Ru Xie, Dongguan (CN)

(73) Assignee: SAE Magnetics (H.K.) Ltd., Shatin (HK)

( * ) Notice: Subject to any disclaimer, the term of this patent is extended or adjusted under 35 U.S.C. 154(b) by 0 days.

(21) Appl. No.: 11/155,911

(22) Filed: Jun. 16, 2005

(65) Prior Publication Data

US 2005/0225904 A1 Oct. 13, 2005

Related U.S. Application Data

(62) Division of application No. 10/356,018, filed on Jan. 30, 2003, now Pat. No. 6,943,991.

(30) Foreign Application Priority Data

Aug. 26, 2002 (WO) .................. PCT/CN02/00589

(51) Int. Cl.
*G11B 5/127* (2006.01)
*G11B 21/24* (2006.01)

(52) U.S. Cl. .............................. 29/603.03; 29/603.04; 29/603.07; 29/25.35; 360/294.4

(58) Field of Classification Search ............ 29/603.03, 29/603.04, 603.07, 25.35; 360/294.4, 234.5, 360/245.9
See application file for complete search history.

(56) References Cited

U.S. PATENT DOCUMENTS

| 5,898,544 | A | * | 4/1999 | Krinke et al. | ............ 360/264.5 |
| 6,198,606 | B1 | * | 3/2001 | Boutaghou et al. | ...... 360/294.3 |
| 6,215,629 | B1 | * | 4/2001 | Kant et al. | .................. 360/290 |
| 6,259,157 | B1 | * | 7/2001 | Sakamoto et al. | .......... 257/723 |

FOREIGN PATENT DOCUMENTS

| CN | 1276593 A | 12/2000 |
| CN | 1288559 A | 3/2001 |
| CN | 1347078 A | 5/2002 |
| JP | 2002-133803 A2 | 5/2002 |

* cited by examiner

*Primary Examiner*—A. Dexter Tugbang
*Assistant Examiner*—Tai Van Nguyen
(74) *Attorney, Agent, or Firm*—Kenyon & Kenyon LLP

(57) ABSTRACT

A micro-actuator that reduces suspension tongue stiffness and a method of manufacturing the micro-actuator are disclosed. In one embodiment, the micro-actuator has a base piece with two arms extending from the base piece. The electric contact pads for the arms are situated on the exterior of the arms at the end opposite the base piece. In one embodiment, the electric contact pads are electrically coupled to the same connection plate that the magnetic read/write head is coupled to, reducing the number of connection traces.

8 Claims, 9 Drawing Sheets

METHOD FOR MANUFACTURING A SUSPENSION DESIGN FOR A CO-LOCATED PZT MICRO-ACTUATOR

RELATED APPLICATION

This application is a Divisional application of patent application Ser. No. 10/356,018, filed on Jan. 30, 2003, now U.S. Pat. No. 6,943,991 which claims the benefit of priority to PCT/CN02/00589, filed on Aug. 26, 2002.

BACKGROUND INFORMATION

The present invention relates to magnetic hard disk drives. More specifically, the present invention relates to electrical connections for micro-actuators.

In the art today, different methods are utilized to improve recording density of hard disk drives. FIG. 1 provides an illustration of a typical disk drive with a typical drive arm 102 configured to read from and write to a magnetic hard disk 104. Typically, voice-coil motors (VCM) 106 are used for controlling a hard drive's arm 102 motion across a magnetic hard disk 106. Because of the inherent tolerance (dynamic play) that exists in the placement of a recording head 108 by a VCM 106 alone, micro-actuators 110 are now being utilized to 'fine-tune' head 108 placement. A VCM 106 is utilized for course adjustment and the micro-actuator 110 then corrects the placement on a much smaller scale to compensate for the VCM's 106 (with the arm 102) tolerance. This enables a smaller recordable track width, increasing the 'tracks per inch' (TPI) value of the hard drive (increased drive density).

FIG. 2 provides an illustration of a micro-actuator as used in the art. Typically, a slider 202 (containing a read/write magnetic head; not shown) is utilized for maintaining a prescribed flying height above the disk surface 104 (See FIG. 1). Micro-actuators may have flexible beams 204 connecting a support device 206 to a slider containment unit 208 enabling slider 202 motion independent of the drive arm 102 (See FIG. 1). An electromagnetic assembly or an electromagnetic/ferromagnetic assembly (not shown) may be utilized to provide minute adjustments in orientation/location of the slider/head 202 with respect to the arm 102 (See FIG. 1).

The electric trace connection connecting the micro-actuator to the printed circuit assembly currently passes over the suspension assembly, or suspension tongue. This design results in an increased stiffness in the suspension assembly due to the electric trace connection. Further, micro-actuator bonding, using methods such as gold ball bonding or solder bump bonding, is difficult as the bonding pad is located on the micro-actuator moving beam. Not enough support space exists to connect the micro-actuator. Also, the bonding process can damage the micro-actuator beam due to pressure or bonding force. The lower stiffness of the electric traces also makes it easier to deform the trace connection.

DETAILED DESCRIPTION

A suspension design for a micro-actuator that reduces suspension tongue stiffness and a method of manufacturing the HGA with the micro-actuator are disclosed. In one embodiment, the micro-actuator has a base piece with two arms extending from the base piece. The electric contact pads for the arms are situated on the exterior of the arms at the end opposite the base piece. In one embodiment, the electric contact pads are electrically coupled to the same connection plate as the magnetic read/write head. This design provides enough support space for the electric coupling of the micro-actuator as well as the magnetic read/write head, preventing the damage caused during the bonding process. The electric connection traces for the micro-actuator are consolidated with the traces for the magnetic read/write head on the outriggers of the suspension tongue, reducing the stiffness of the tongue itself.

Figure 1:
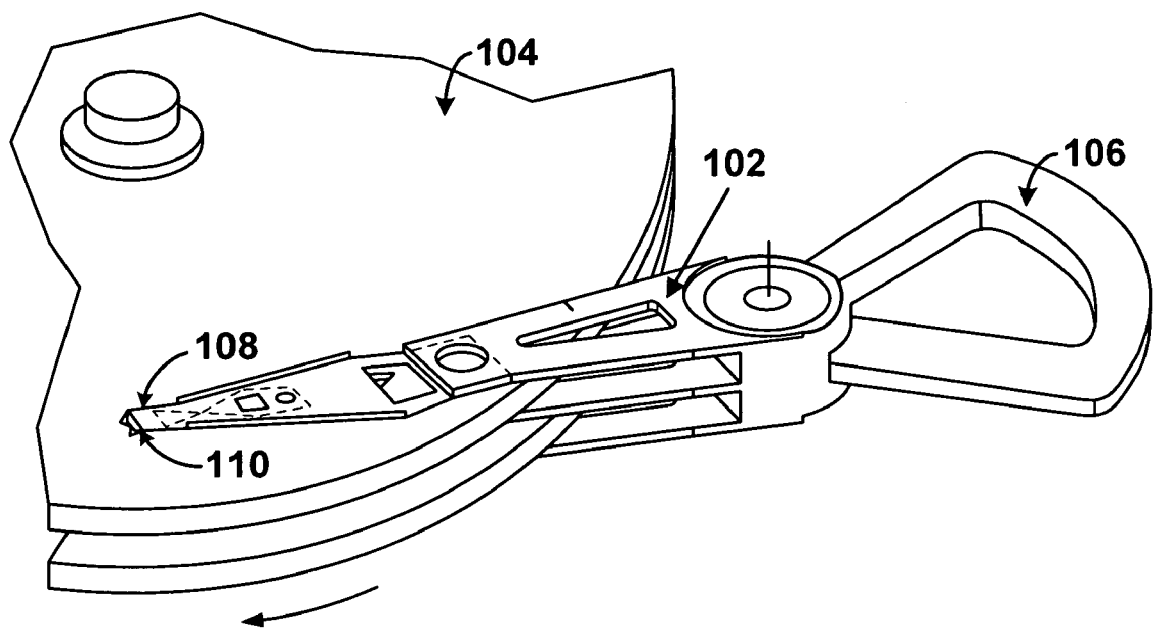
FIG. 1 provides an illustration of an internal view of a hard disk drive including a drive arm configured to read from and write to a magnetic hard disk as used in the art.
Figure 2:
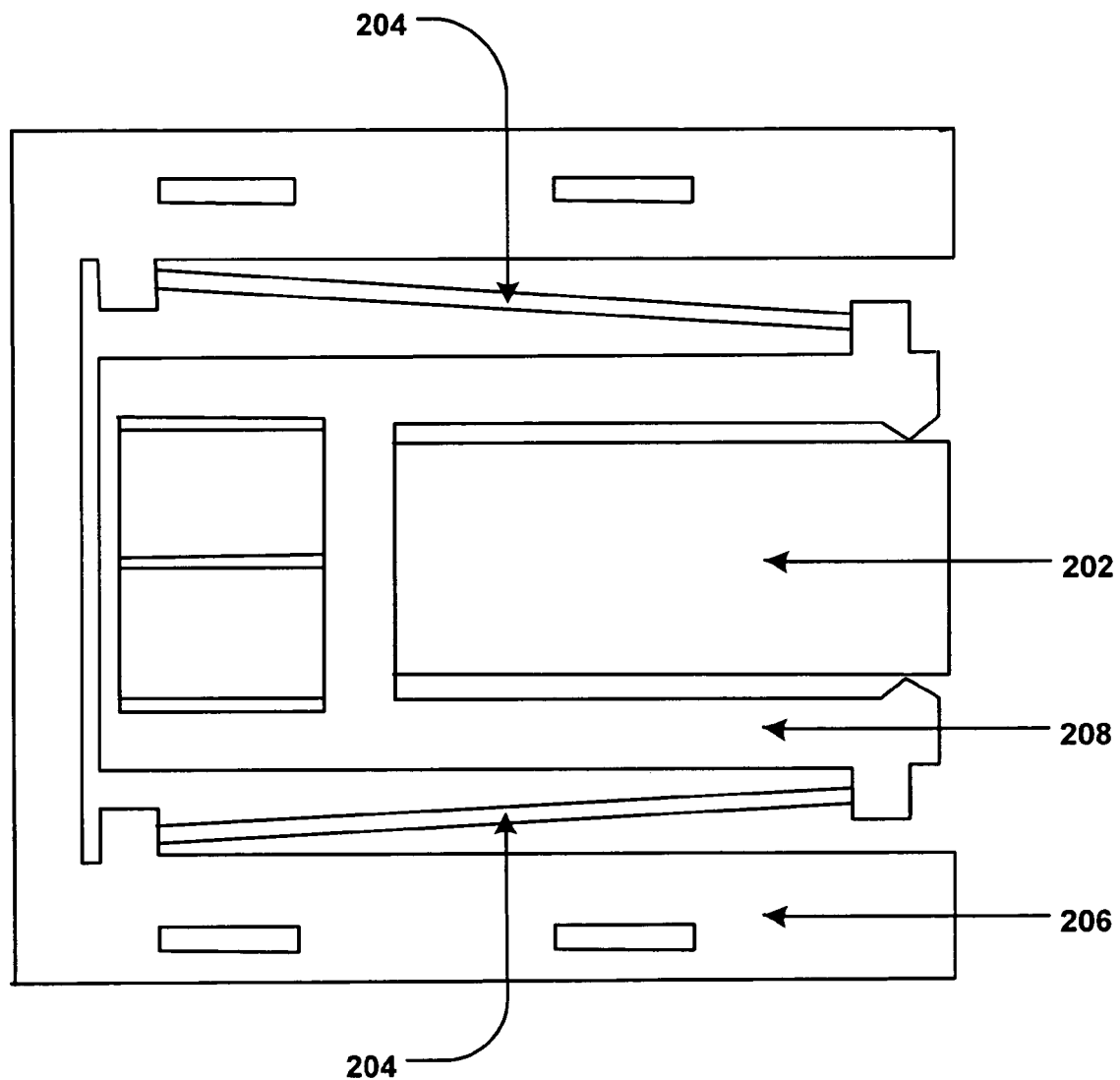
FIG. 2 provides an illustration of a micro-actuator as used in the art.
Figure 3A:
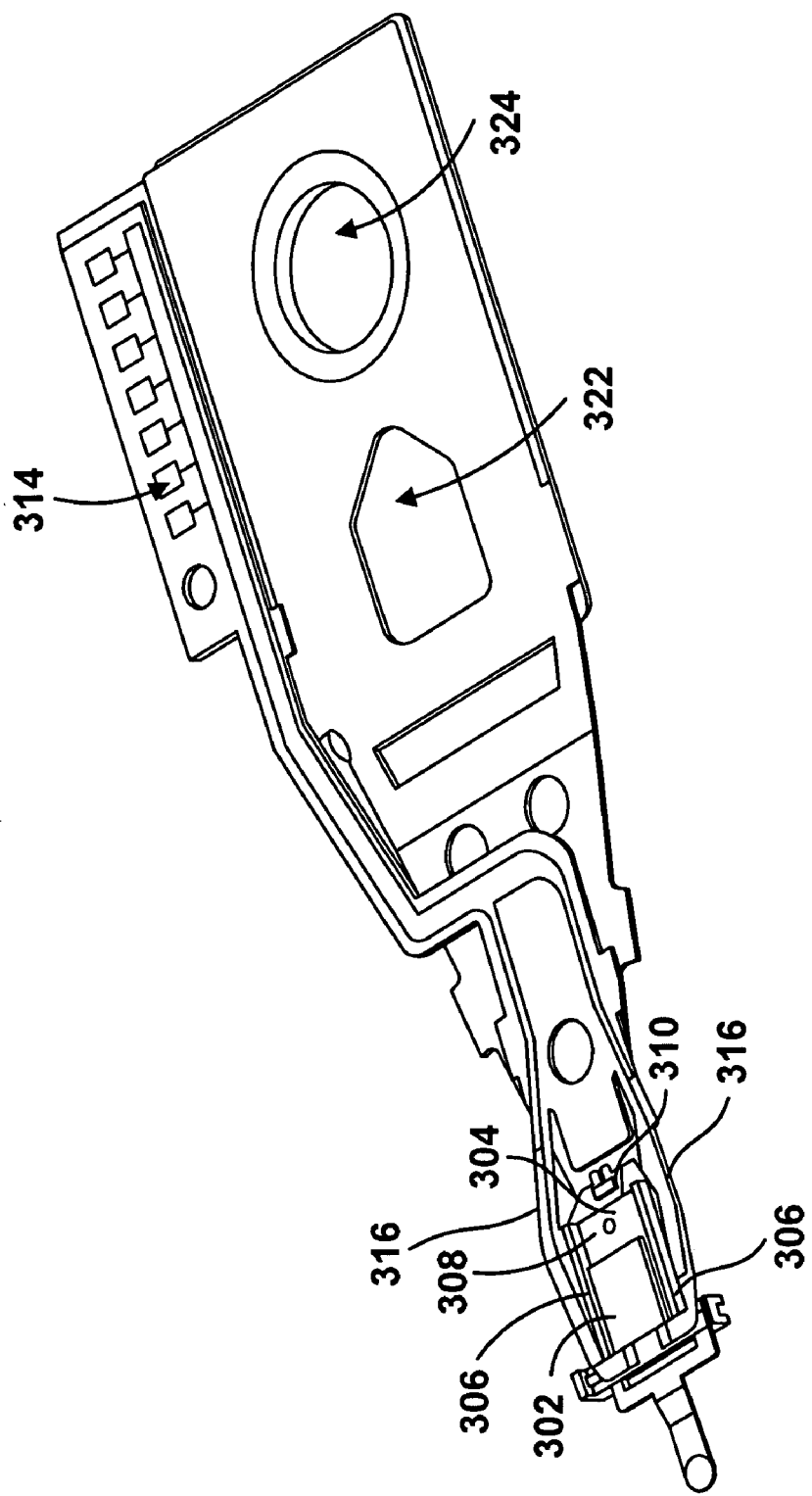
FIGS. 3a–b describes a hard disk drive head gimbal assembly (HGA) with a 'U'-shaped micro-actuator under principles of the present invention.
Figure 3B:
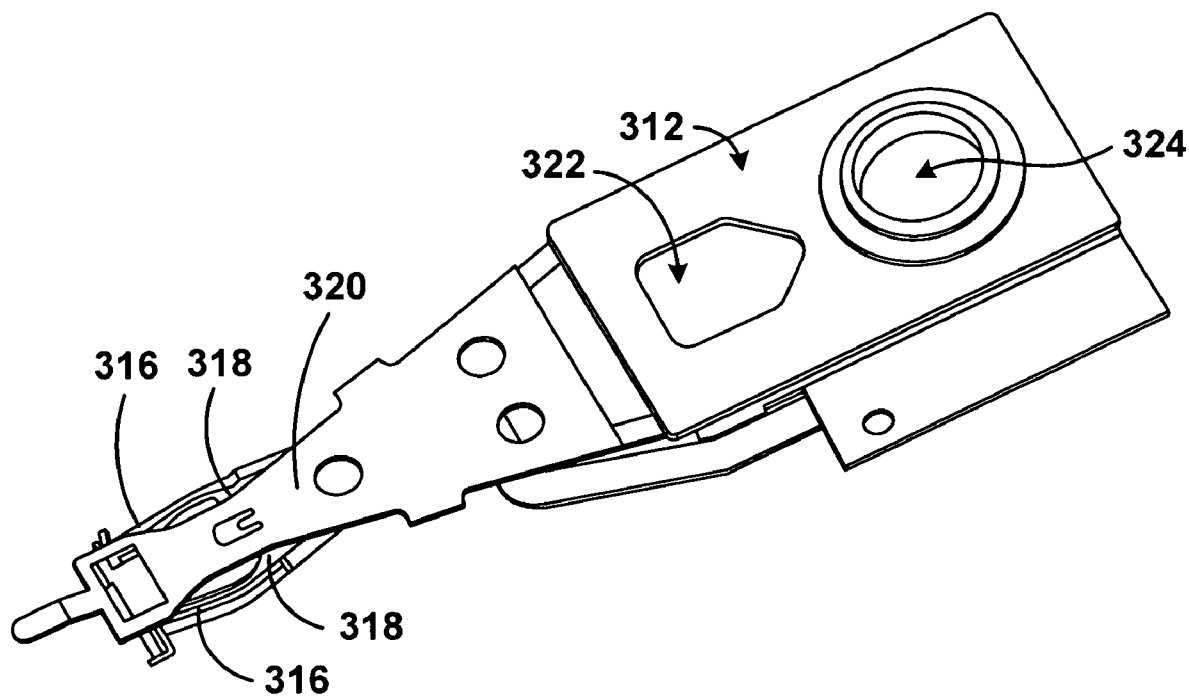

Illustrated in an upside-down orientation, FIG. 3a describes one embodiment of a hard disk drive head gimbal assembly (HGA) with a 'U'-shaped micro-actuator. In one embodiment, a magnetic read/write head 302, or slider, is coupled to a 'U'-shaped micro-actuator 304. In a further embodiment, the 'U'-shaped micro-actuator has a piezoelectric Lead Zirconate Titanate (PZT) beam (arm) 306 extending from each side of a base piece 308. In another embodiment, the 'U' shaped micro-actuator base piece 308 is attached to the suspension tongue 310 of an HGA 312 by partial potting. The tongue creates a parallel gap between the suspension tongue and the bottom of the PZT beam 306 and the bottom surface of the slider 302. In one embodiment, the parallel gap is 25 µm to 50 µm. In one embodiment, a printed circuit assembly 314 is electrically coupled to the slider 302 to control reading and writing functions. A pair of outriggers 316, each with a bend 318, supports the suspension tongue 310 and maintains the parallel gap between the suspension tongue 310 and a loadbeam 320. In one embodiment, the bending height is 50 µm. A first hole 322 is cut into the HGA 312 to reduce weight. A second hole 324 allows the HGA 312 to be mounted on a pivot. FIG. 3b illustrates the present embodiment in a reverse orientation.

Figure 4A:
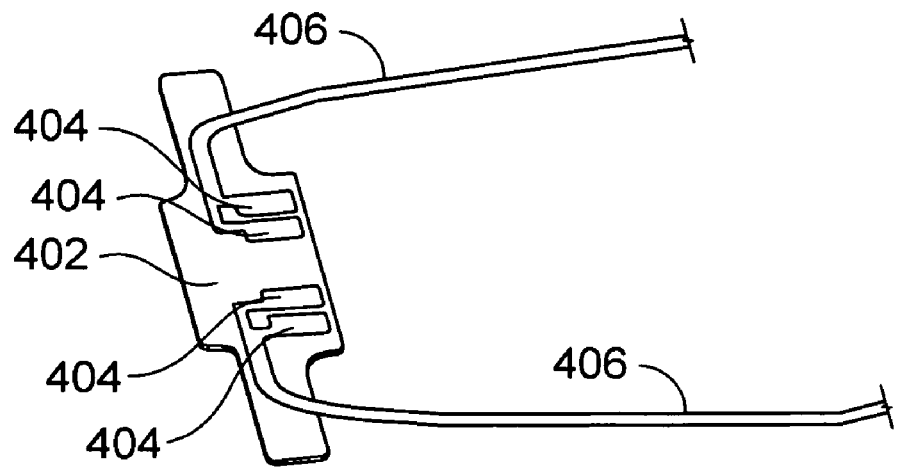
FIGS. 4a–d provide an illustration of one embodiment of a micro-actuator with the electric arm contact pads situated near the base piece of the micro-actuators.
Figure 4B:
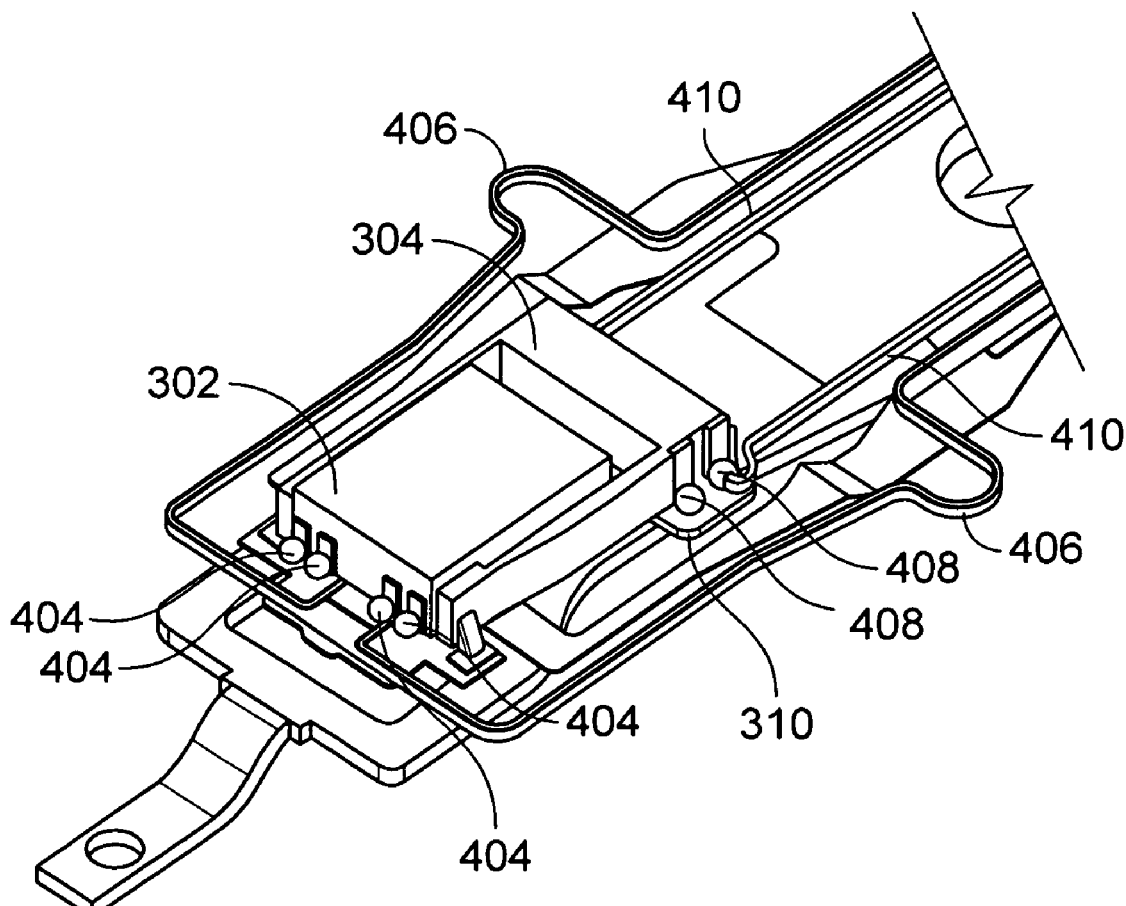
Figure 4C:
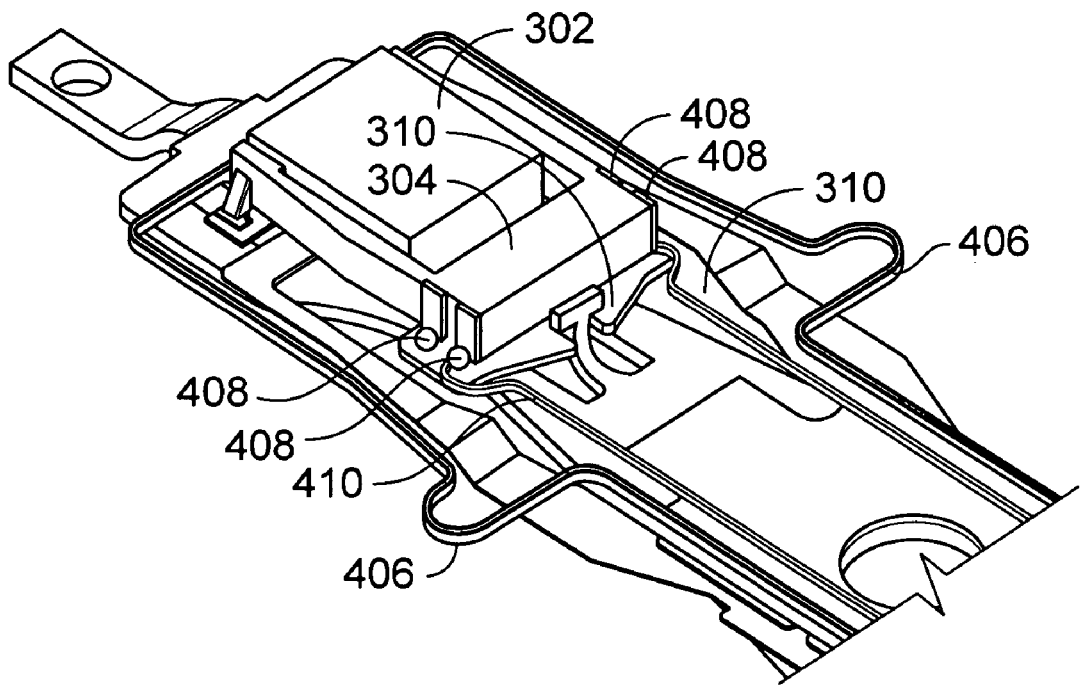
Figure 4D:
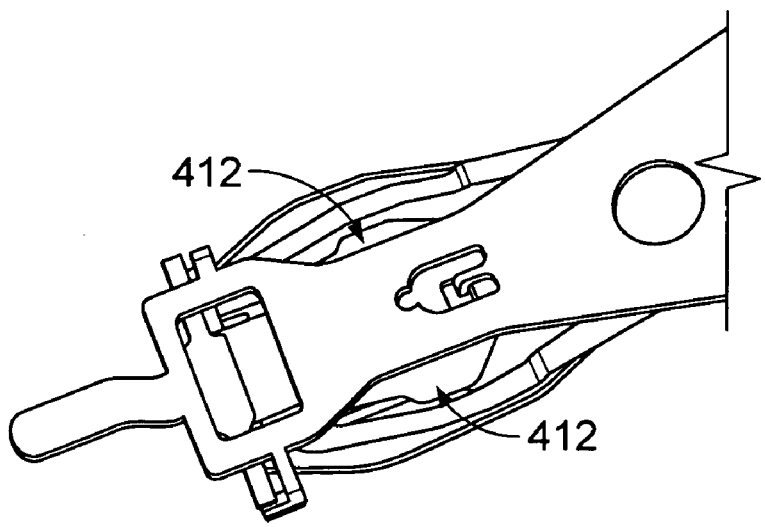

FIGS. 4a–d illustrate an embodiment of a micro-actuator 302 incorporated into a known HGA 312 (e.g., such as the one described in Japanese Patent 2002-133803). FIG. 4a shows one embodiment of a connection plate 402. In one embodiment, the connection plate has a set of electric head plate contact pads 404 attached to the connection plate 402. In a further embodiment, the set of electric head plate contact pads 404 includes read electric plate contact pads and write electric plate contact pads. In one embodiment, a first set of one or more connection traces 406 connects the set of electric head plate contact pads 404 with the printed circuit assembly 314. FIG. 4b shows a top trailing edge view of one embodiment of the head 302 coupled to the micro-actuator 304 and the connection plate 402. The head 302 is electrically coupled to the electric head plate contact pads 404. In one embodiment, the head is electrically coupled by solder bump bonding or gold ball bonding. A set of electric arm contact pads 408 is attached to the suspension assembly 310. A second set of one or more connection traces 410 connects the set of electric arm contact pads 408 to the printed circuit assembly 314. The connection traces 406 for the electric head plate contact pads are exposed and subject to deformation. FIG. 4c shows a top leading edge view of one embodiment of the head 302 coupled to the micro-actuator 304 and connection plate 402. FIG. 4d shows a bottom view of one embodiment, of the loadbeam 320 and suspension tongue 310. Only a small amount of support space 412 is available for the electric bonding of the micro-actuator, making the micro-actuator susceptible to damage.

Figure 5A:
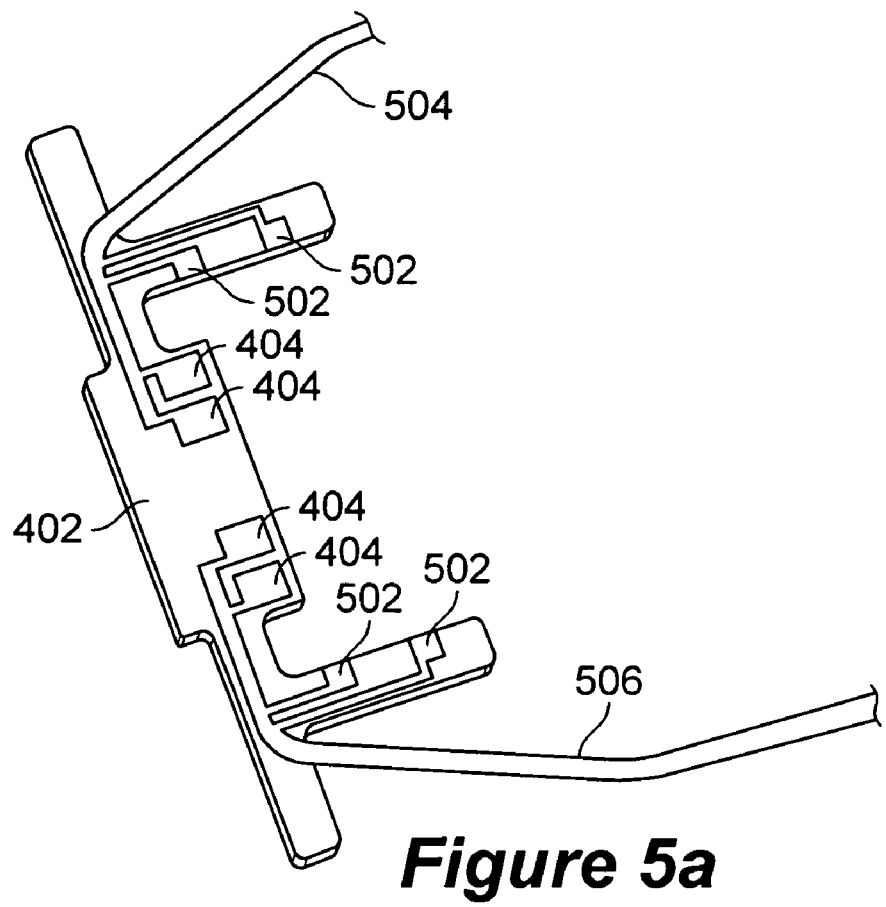
FIGS. 5a–c provide an illustration of one embodiment of the components of a head gimbal assembly and a micro-actuator with the electric arm contact pads situated away from the base piece of the micro-actuator.
Figure 5B:
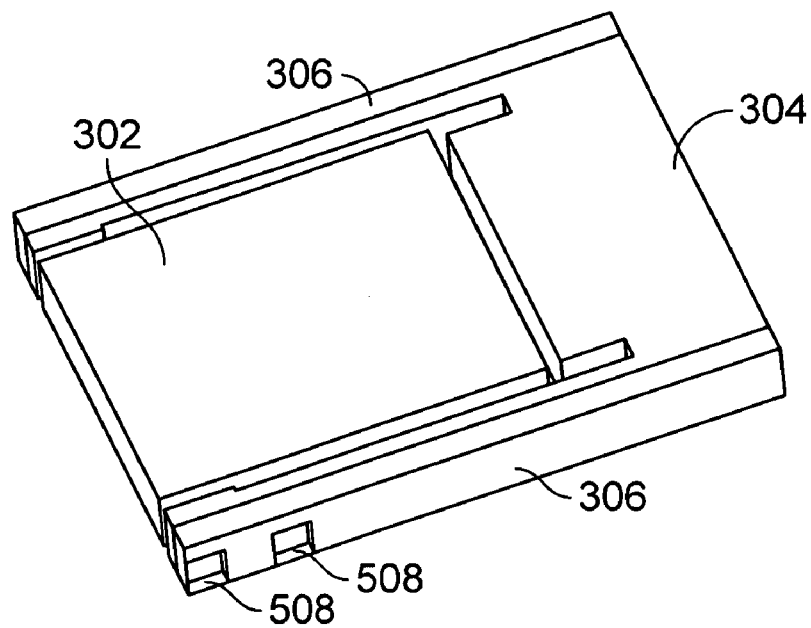
Figure 5C:
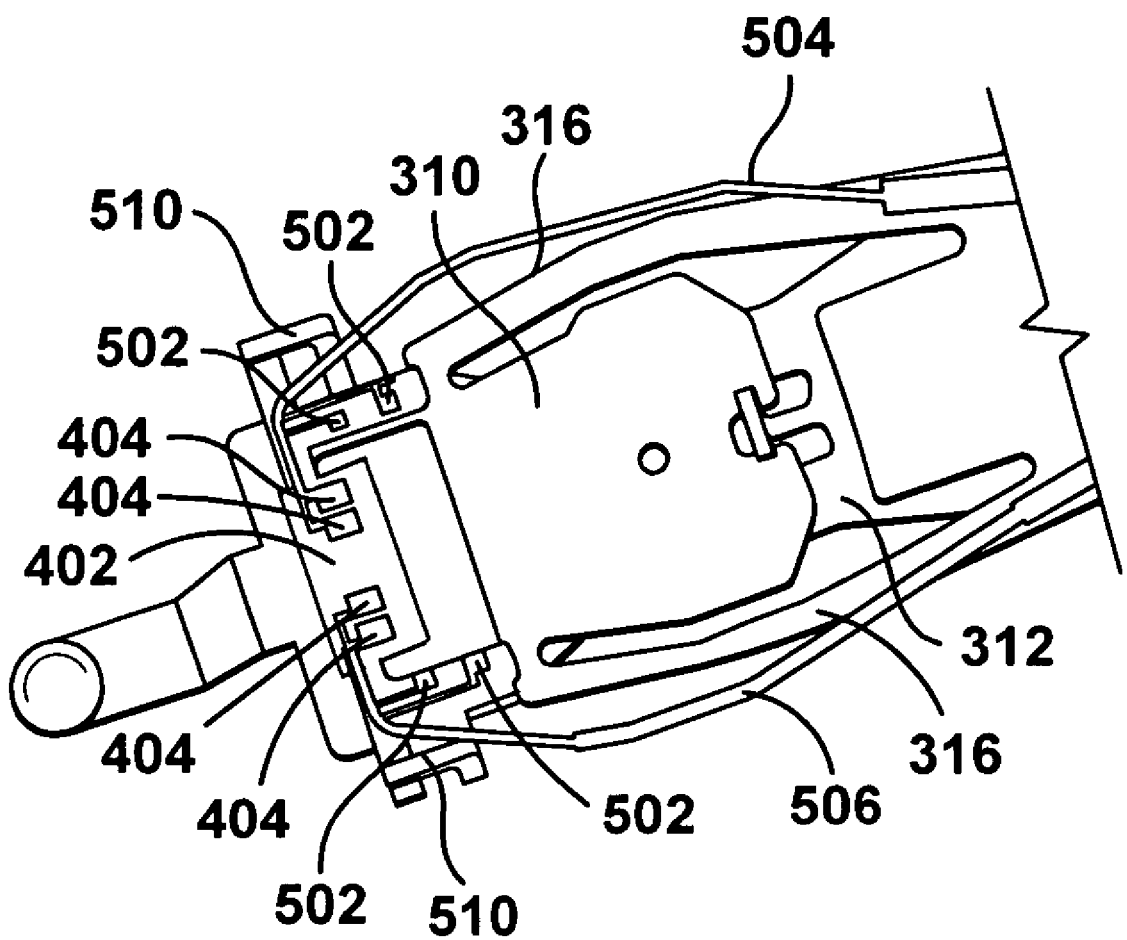

FIGS. 5a–c illustrate the components of one embodiment of the present invention. FIG. 5a illustrates one embodiment of a connection plate 402. In one embodiment, the connection plate 402 has a set of electric head plate contact pads 404 and a set of electric arm plate contact pads 502 attached to the connection plate 402. In one embodiment, a first set of one or more separated connection traces 504 connects a first set of electric head plate contact pads 404 and a first set of electric arm plate contact pads 502 with the printed circuit assembly 314. In an alternate embodiment, a second set of separated connection traces 506 connects a second set of electric head plate contact pads 404 and a second set of electric arm plate contact pads 502 with the printed circuit assembly 314. In one embodiment, the left electric arm plate contact pads 502 and the right electric arm plate contact pads may be interconnected.

FIG. 5b illustrates one embodiment of a micro-actuator 304 and magnetic read/write head 302. In one embodiment, the magnetic read/write head is coupled between the two arms 306 of the micro-actuator 304. In a further embodiment, a set of one or more electric arm contact pads 508 is attached to the exterior of each arm 306 at the end opposite the base piece 308.

FIG. 5c illustrates one embodiment of a suspension tongue 310. The connection plate 402 is inserted between the loadbeam 320 and two limiters 510. In one embodiment, a first set of one or more connection traces 504 and a second set of one or more connection traces 506 link the connection plate 402 to the printed circuit assembly 314 via the HGA 312. The first set of separated connection traces 504 and the second set of separated connection traces 506 have increased stiffness as they include the connection traces for the magnetic read/write head 302 and the micro-actuator 308.

Figure 6:
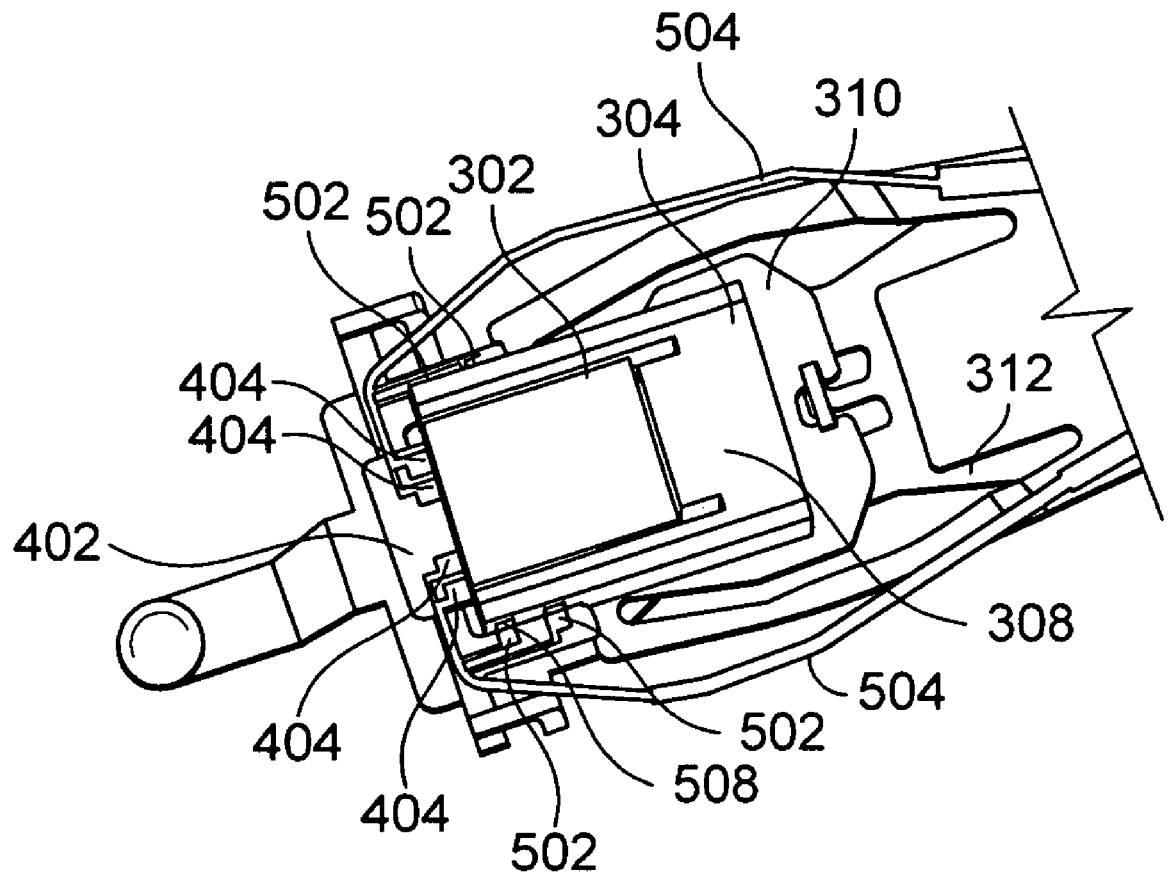
FIG. 6 provides an illustration of one embodiment of an assembled head gimbal assembly micro-actuator with the electric arm contact pads situated away from the base piece of the micro-actuator.

FIG. 6 illustrates one embodiment of the micro-actuator 304 assembled with the connection plate 402 and the HGA 312. The base piece 308 of the micro-actuator 304 is affixed to the suspension assembly 310 of the HGA 312. In one embodiment, the base piece 308 is coupled to the suspension assembly 310 by partial potting. In one embodiment, the magnetic read/write head 302 is situated between the arms 306 of the micro-actuator 304. In one embodiment, the magnetic read/write head 302 is electrically coupled to the electric head plate contact pads 404 attached to the connection plate 402. In a further embodiment, the set of electric arm contact pads 508 attached to the arms 306 of micro-actuator is electrically coupled to the set of electric arm plate contact pads 502 attached to the connection plate 402. This coupling allows the printed circuit assembly 314 to control the movement of the micro-actuator arms 306. In a further embodiment, the electric arm plate contact pads 502 and the electric head plate contact pads 404 of the connection plate 402 supply enough space to support the boding of both the head 302 and the micro-actuator 304.

Although several embodiments are specifically illustrated and described herein, it will be appreciated that modifications and variations of the present invention are covered by the above teachings and within the purview of the appended claims without departing from the spirit and intended scope of the invention set of electric arm plate contact pads.

The invention claimed is:

1. A method, comprising:
   manufacturing a micro-actuator with a first piezoelectric arm coupled at a first end to a base piece and a second piezoelectric arm coupled at a first end to the base piece;
   attaching a first electric arm contact pad to the first piezoelectric arm at a second end opposite to the base piece;
   attaching a second electric arm contact pad to the second piezoelectric arm at a second end opposite to the base piece:
   attaching a first and a second set of electric head plate contact pads to a connection plate:
   electrically coupling the first and second set of electric head plate contact pads to the magnetic read/write head:
   attaching a first and a second set of electric arm plate contact pads to the connection plate: and
   electrically coupling the first and second set of electric arm plate contact pads to the first and second electric arm contact pads.

2. The method of claim 1, further comprising coupling the micro-actuator to a suspension assembly of the head gimbal assembly.

3. The method of claim 2, wherein the micro-actuator is coupled at the base piece to the suspension assembly by partial potting.

4. The method of claim 2, further comprising maintaining a parallel gap between the suspension assembly and a bottom surface of the magnetic read/write head and the micro-actuator.

5. The method of claim 1, further comprising:
   attaching one or more first extra electric arm contact pads to the first piezoelectric arm at a second end opposite to the base piece; and
   attaching one or more second extra electric arm contact pads to the second piezoelectric arm at a second end opposite to the base piece.

6. The method of claim 1, further comprising connecting the first set of electric head plate contact pads and the first set of electric arm plate contact pads to a printed circuit assembly with a first set of electrical connection traces.

7. The method of claim 1, further comprising connecting the second set of electric head plate contact pads and the second set of electric arm plate contact pads to a printed circuit assembly with a second set of electrical connection traces.

8. The method of claim 1, wherein the first and second set of electric head plate contact pads each include a set of read electric head plate contact pads and a set of write electric head plate contact pads.

* * * * *